(12) United States Patent
Li

(10) Patent No.: US 11,860,446 B2
(45) Date of Patent: Jan. 2, 2024

(54) ATTACHMENT POSITION ADJUSTABLE MEMBRANE

(71) Applicant: RIGHT GROUP CENTRAL CO., LTD., New Taipei (TW)

(72) Inventor: Chuan-En Li, New Taipei (TW)

(73) Assignee: RIGHT GROUP CENTRAL CO., LTD., New Taipei (TW)

(*) Notice: Subject to any disclaimer, the term of this patent is extended or adjusted under 35 U.S.C. 154(b) by 397 days.

(21) Appl. No.: 17/214,903

(22) Filed: Mar. 28, 2021

(65) Prior Publication Data
US 2022/0163763 A1  May 26, 2022

(30) Foreign Application Priority Data
Nov. 23, 2020 (TW) ................................. 109140995

(51) Int. Cl.
*G02B 7/20* (2021.01)
*G02B 5/00* (2006.01)
*G06F 21/84* (2013.01)

(52) U.S. Cl.
CPC ............... *G02B 7/20* (2013.01); *G02B 5/003* (2013.01); *G06F 21/84* (2013.01); *G02B 2207/123* (2013.01)

(58) Field of Classification Search
CPC ..... G02B 7/20; G02B 5/003; G02B 2207/123
USPC ................................. 359/885, 893, 896, 900
See application file for complete search history.

(56) References Cited

U.S. PATENT DOCUMENTS

| | | | |
|---|---|---|---|
| 2007/0181456 A1* | 8/2007 | Kusuda ................. | G06F 1/1626 206/443 |
| 2010/0258691 A1* | 10/2010 | Zdancewicz .......... | G06F 1/1609 24/306 |
| 2014/0128131 A1* | 5/2014 | Sin ........................ | H04B 1/3888 455/575.8 |
| 2019/0086967 A1* | 3/2019 | Ohsawa ................ | G06F 1/1637 |
| 2019/0138737 A1* | 5/2019 | Leipold .................... | G06F 21/84 |
| 2020/0241181 A1* | 7/2020 | Lee ........................ | G06F 1/1616 |

* cited by examiner

*Primary Examiner* — William R Alexander
*Assistant Examiner* — Sharrief I Broome

(57) ABSTRACT

An attachment position adjustable membrane, including a membrane body and at least one attachment member. The membrane body allows light to pass through, and the membrane body is provided with at least one accommodating and guiding portion. The attachment member is movably disposed in the at least one accommodating and guiding portion, wherein the at least one attachment member is movable between a first position and a second position in the accommodating and guiding portion.

22 Claims, 11 Drawing Sheets

ATTACHMENT POSITION ADJUSTABLE MEMBRANE

CROSS REFERENCE TO RELATED APPLICATIONS

The present application claims the benefit of Taiwanese Patent Application No. 109140995 filed on Nov. 23, 2020, the contents of which are incorporated herein by reference in their entirety.

BACKGROUND OF THE INVENTION

1. Field of the Invention

The present invention relates to the technical field of membranes, and in particular, to an attachment position adjustable membrane in which an attachment member can be moved to adjust an attachment position.

2. Description of the Related Art

To maintain privacy during use of an electronic device having a picture, for example, when using a notebook computer, a tablet computer or even a smart mobile phone that displays picture on a screen, to prevent people around from seeing the picture displayed by the electronic device, a user of the electronic device usually provides a privacy filter on the screen so that the picture displayed on the screen can only be seen within a certain angle range. In this way, the user can view the picture displayed on the screen while maintaining privacy. In addition, to protect eye health of the user, the screen of the electronic device is also provided with a light filter to filter light that is harmful to eyes.

For ease of use, the privacy filter or the light filter generally needs to be positioned on the screen of the electronic device. The privacy filter or the light filter is mostly positioned to fit the structure of the screen of the electronic device, for example, since a screen panel of the electronic device and a frame of a mounting panel often form a stepped portion, the privacy filter or the light filter may be placed directly on the surface of the screen and is positioned on the surface of the screen by means of the stepped portion. For an electronic device having no stepped portion between the frame and the panel, such as a notebook computer, a tablet computer or a smart mobile phone, the privacy filter or the light filter is provided with an attachment member for positioning on the screen of the electronic device, and the attachment member is generally an adhesive or a magnet. Moreover, in order to provide certain functions, such as screen sleep or wake-up, the manufacturer of the electronic device provides a corresponding magnet on the frame of the screen of the electronic device, so that when the screen covers a main unit or is opened from the main unit, the function of screen sleep or wake-up is triggered by magnetic induction produced by the magnet of the screen and a magnet of a main unit housing. Therefore, the privacy filter or the light filter may be attracted to a screen frame by using an existing magnet structure in the screen frame. Hence, magnetic poles of the attachment member of the privacy filter or the light filter are configured to be opposite to magnetic poles of the frame of the electronic device so that the two attract each other, thereby achieving the function of positioning the privacy filter or the light filter on the frame of the electronic device.

When manufacturers of electronic devices mount magnets on frames of screens, orders of magnetic pole arrangements may result in the same models but opposite magnetic pole arrangements due to the difference in manufacturing method. Thus, the existing attachment member, which is a structure fixed to a privacy filter or light filter body, may cause the same magnetic poles to correspond to each other and repel each other due to the opposite magnetic pole arrangements of the electronic devices. Therefore, the privacy filter or the light filter cannot be attracted to the screen frames of some electronic devices with different magnet arrangements.

SUMMARY OF THE INVENTION

In view of the above, the objective of the present invention is to provide an attachment position adjustable membrane. The position of an attachment member on a membrane body can be adjusted by movement. For an electronic device with an opposite magnetic pole arrangement in a screen frame, by means of the movement of the attachment member, the membrane may correspond to the screen frame of the electronic device again with opposite magnetic poles to generate attraction force, so that the membrane may be attracted to the screen frame of the electronic device. Therefore, the attachment position adjustable membrane of the present invention may be adapted to electrode devices with different magnetic pole arrangements.

In an embodiment, the attachment position adjustable membrane of the present invention includes a membrane body and at least one attachment member. The membrane body allows light to pass through, and the membrane body is provided with at least one accommodating and guiding portion. The attachment member is movably disposed in the at least one accommodating and guiding portion, wherein the at least one attachment member is movable between a first position and a second position in the accommodating and guiding portion.

In another embodiment, the accommodating and guiding portion is a slot, the slot has a long edge and a short edge, and the at least one attachment member is disposed in the slot and moves between the first position and the second position along the long edge.

In another embodiment, the membrane body has a first edge, the slot is disposed close to the first edge, and the long edge of the slot is parallel to the first edge.

In another embodiment, the attachment position adjustable membrane of the present invention further includes at least one shielding member that is disposed on the membrane body and covers the slot.

In another embodiment, the at least one shielding member spans both sides of the first edge and covers openings of the slot located on two sides of the membrane body.

In another embodiment, the attachment position adjustable membrane of the present invention includes two shielding members. The shielding members are respectively disposed on two sides of the membrane body and respectively cover openings of the slot located on the two sides of the membrane body.

In another embodiment, the membrane body is provided with a relief groove, the relief groove is located on the first edge, and the relief groove corresponds to an optical lens of an electronic device.

In another embodiment, the attachment position adjustable membrane of the present invention includes at least two slots, and the slots are respectively disposed on two sides of the relief groove.

In another embodiment, the position of the second magnetic pole of the attachment member at the first position corresponds to the position of the first magnetic pole of the attachment member at the second position.

In another embodiment, the length of the long edge of the slot is 1.5 longer than times the length of the attachment member, and the length of the first magnetic pole and the length of the second magnetic pole are each half of the length of the attachment member.

In another embodiment, the accommodating and guiding portion is a recessed portion disposed on a plane of the membrane body, and the attachment member is movably disposed in the recessed portion.

In another embodiment, the recessed portion has a long edge, and the attachment member moves between the first position and the second position along the long edge.

In another embodiment, the attachment position adjustable membrane of the present invention further includes at least one shielding member that is disposed on the membrane body and covers the recessed portion.

In another embodiment, the accommodating and guiding portion is a housing combined with the surface of the membrane body, and the attachment member is movably disposed in the housing.

According to the attachment position adjustable membrane of the present invention, by providing the accommodating and guiding portion having a greater length than the attachment member on the membrane body, the attachment member may be moved by the guide of the accommodating and guiding portion. Moreover, the accommodating and guiding portion also provides a space for the attachment member to move, so that the attachment member may move according to magnetic pole positions of the magnet provided in the screen frame of the electronic device. Thus, the magnetic poles with different magnetic properties are arranged correspondingly, so that the attachment member is attracted to the screen frame of the electronic device, thereby achieving the effect of positioning the membrane on the screen frame of the electronic device.

DETAILED DESCRIPTION OF THE PREFERRED EMBODIMENTS

Figure 1:
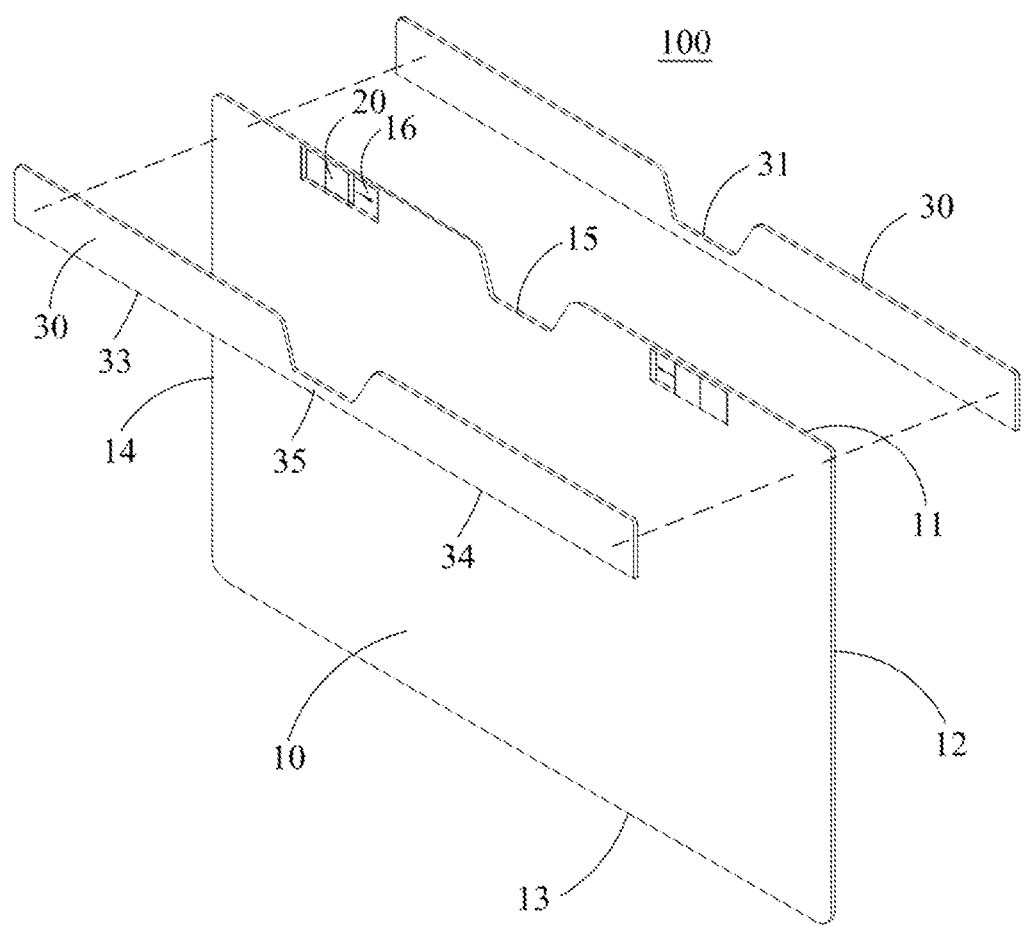
FIG. 1 is an exploded perspective view of a first embodiment of an attachment position adjustable membrane according to the present invention.
Figure 2:
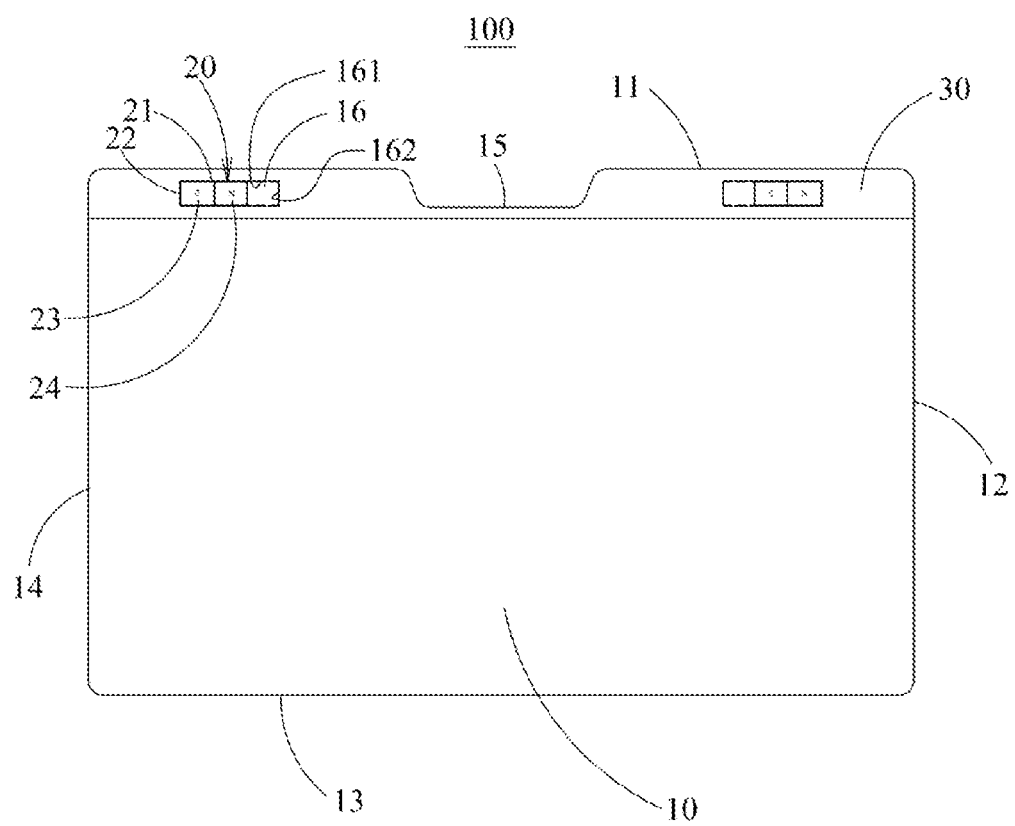
FIG. 2 is a front view of the attachment position adjustable membrane in FIG. 1.

Referring to FIG. 1 and FIG. 2, FIG. 1 and FIG. 2 show a first embodiment of an attachment position adjustable membrane according to the present invention. An attachment position adjustable membrane 100 of the present invention includes a membrane body 10, at least one attachment member 20, and at least one shielding member 30.

Figure 3:
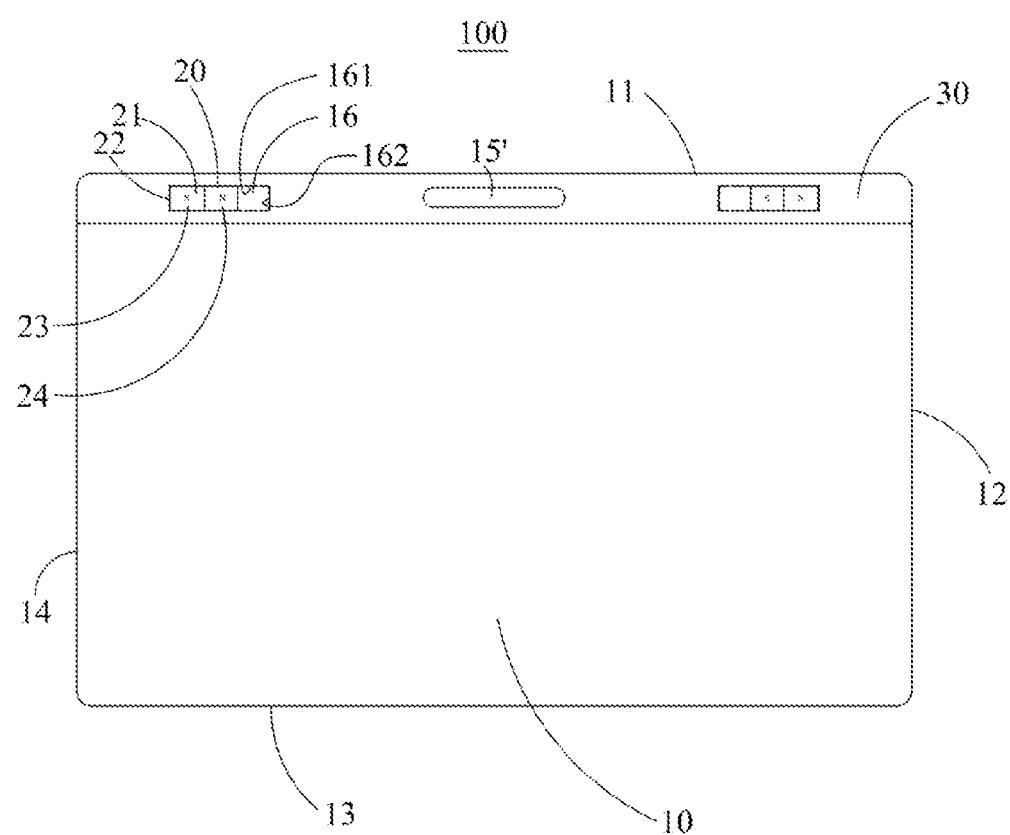
FIG. 3 is a front view of a second embodiment of an attachment position adjustable membrane according to the present invention.

In this embodiment, the membrane body 10 includes a grating layer and protective layers disposed on upper and lower surfaces of the grating layer. The grating layer has a grid structure configured to limit an angle of light diffusion, so that after the light passes through the membrane body 10, an irradiation range of emergent light thereof is limited to a given angle range. The membrane body 10 may also have other structures for limiting light diffusion, for example, liquid crystal molecules are provided. The shape of the membrane body 10 is formed to fit the shape, size and structure of a screen of an electronic device. In other embodiments, the membrane body 10 may also be a light filter for absorbing a specific wavelength or an anti-glare sheet having a microstructure on the surface to scatter light. In this embodiment, as shown in FIG. 1 and FIG. 2, the membrane body 10 is rectangular, and has a first edge 11, a second edge 12, a third edge 13, and a fourth edge 14. The first edge 11 and the third edge 13 are long edges. The second edge 12 and the fourth edge 14 are short edges. When the attachment position adjustable membrane 100 of the present invention is placed on the screen of the electronic device, the first edge 11 corresponds to an upper edge of the screen, the third edge 13 corresponds to a lower edge of the screen, and the second edge 12 and the fourth edge 14 respectively correspond to left and right edges of the screen. The electronic device, such as a notebook computer, tablet computer or a smart mobile phone, is generally provided with a video or photography lens and a device such as a speaker or a microphone on an upper edge of a screen frame. Therefore, the membrane body 10 is provided with a relief groove 15 to fit a transceiver port of an optical or audio device of the electronic device, in order to prevent the membrane body 10 from affecting the transmission and reception of light or sound. FIG. 3 shows a second embodiment of the attachment position adjustable membrane 100 according to the present invention. In this embodiment, a through hole 15' is provided close to the center of the first edge 11 of the membrane body 10. The position of the through hole 15' corresponds to that of the transceiver port of the optical or audio device of the electronic device, which can also prevent the membrane body 10 from affecting the transmission and reception of light or sound.

Considering the characteristic that the membrane body 10 is prone to sliding down due to the weight thereof and factors such as the balance and stability of installation, a mechanism for positioning the membrane body 10 on a screen frame is provided at least on the first edge 11, and certainly, the mechanisms may also be provided on both the first edge 11 and the third edge 13 to achieve a more stable positioning effect, or even the first edge 11, the second edge 12, the third edge 13, and the fourth edge 14 are all provided with the mechanisms for positioning on the screen frame. The attachment position adjustable membrane 100 of the present invention is provided with a magnetic attachment member 20. Therefore, the attachment position adjustable membrane 100 of the present invention is applicable to a screen of an electronic device provided with a magnet in a frame to attract the membrane.

As shown in FIG. 1 and FIG. 2, the membrane body 10 is provided with at least one accommodating and guiding portion 16. The at least one attachment member 20 is movably disposed in the at least one accommodating and guiding portion 16. To fit the magnet of the screen of the electronic device, the accommodating and guiding portion 16 is formed close to the first edge 11 of the membrane body 10. Because magnets for attraction of various electronic devices are different in both arrangement position and number, the accommodating and guiding portions 16 may also be provided on the first edge 11 and the third edge 13 as stated above, or even the first edge 11, the second edge 12, the third edge 13 and the fourth edge 14 are all provided with the accommodating and guiding portions 16. The at least one attachment member 20 has a first magnetic pole 23 and a second magnetic pole 24. The first magnetic pole 23 is disposed adjacent to the second magnetic pole 24. The first magnetic pole 23 and the second magnetic pole 24 are magnetic poles with opposite polarities. For example, in this embodiment, the first magnetic pole 23 is a south pole, and the second magnetic pole 24 is a north pole. The first magnetic pole 23 and the second magnetic pole 24 of the attachment member 20 are respectively disposed corresponding to the magnet with opposite polarities in the screen frame of the electronic device, so that the attachment member 20 is attracted to and positioned on the screen frame of the electronic device. In this embodiment, the magnetic force of the first magnetic pole 23 and the second magnetic pole 24 of the attachment member 20 is 500-2500 Gauss.

In another embodiment, the attachment member 20 may also be made of a ferromagnetic material, such as an iron, cobalt or nickel thin sheet member, and may be attracted by the magnet disposed in the screen frame to also achieve the effect of attraction. Moreover, the attachment member 20 may move according to the arrangement position of the magnet of the screen frame. Thus, the attachment position adjustable membrane 100 of the present invention may be applied to various electronic devices with different magnet arrangement positions.

As stated above, since it is desired to position the membrane body 10 on the screen frame without moving randomly, the attachment member 20 has a first magnetic pole 23 and a second magnetic pole 24 with different polarities, to correspondingly attract the magnet in the screen frame. However, the magnetic pole arrangement mode of the magnet of the screen frame varies with product specifications of individual manufacturers. Therefore, the attachment member 20 of the attachment position adjustable membrane 100 of the present invention is configured to be movable in the accommodating and guiding portion 16, so that attachment member 20 fits the different magnetic pole arrangements of the magnets of the screen frames, and may be attracted to the screen frames.

As shown in FIG. 1 and FIG. 2, the accommodating and guiding portion 16 in this embodiment is a slot that is disposed on the membrane body 10 and penetrates two opposite surfaces of the membrane body 10, and the shape of the attachment member 20 fits the shape of the slot. In this embodiment, the accommodating and guiding portion 16 is rectangular, and has two long edges 161 and two short edges 162. The long edges 161 are parallel to the first edge 11 of the membrane body 10. The attachment member 20 is also configured as a rectangular sheet object to fit the shape of the accommodating and guiding portion 16, and long edges 21 of the attachment member 20 abut against the long edges 161 of the accommodating and guiding portion 16 and the length of the long edges 21 of the attachment member 20 is less than that of the long edges 161 of the accommodating and guiding portion 16. Moreover, the length of short edges 22 of the attachment member 20 is slightly less than the length of the short edges of the accommodating and guiding portion 16 so that the attachment member 20 is restricted and cannot move in a direction along the short edges 162 the accommodating and guiding portion 16, and can only move in a direction along the long edges 161 of the accommodating and guiding portion 16. In addition, since the short edges 22 of the attachment member 20 abut against the short edges 162 of the accommodating and guiding portion 16, the moving range of the attachment member 20 may be restricted. The long edges 161 of the accommodating and guiding portion 16 may be in a flat shape, and the long edges 161 of the accommodating and guiding portion 16 may also be in a convex or concave shape. Moreover, the long edges 21 of the attachment member 20 are formed into a flat shape or correspondingly formed into a concave or convex shape to fit the long edges 161 of the accommodating and guiding portion 16, so that the attachment member 20 is positioned in the accommodating and guiding portion 16 by means of configuration fit of edges.

Figure 7:
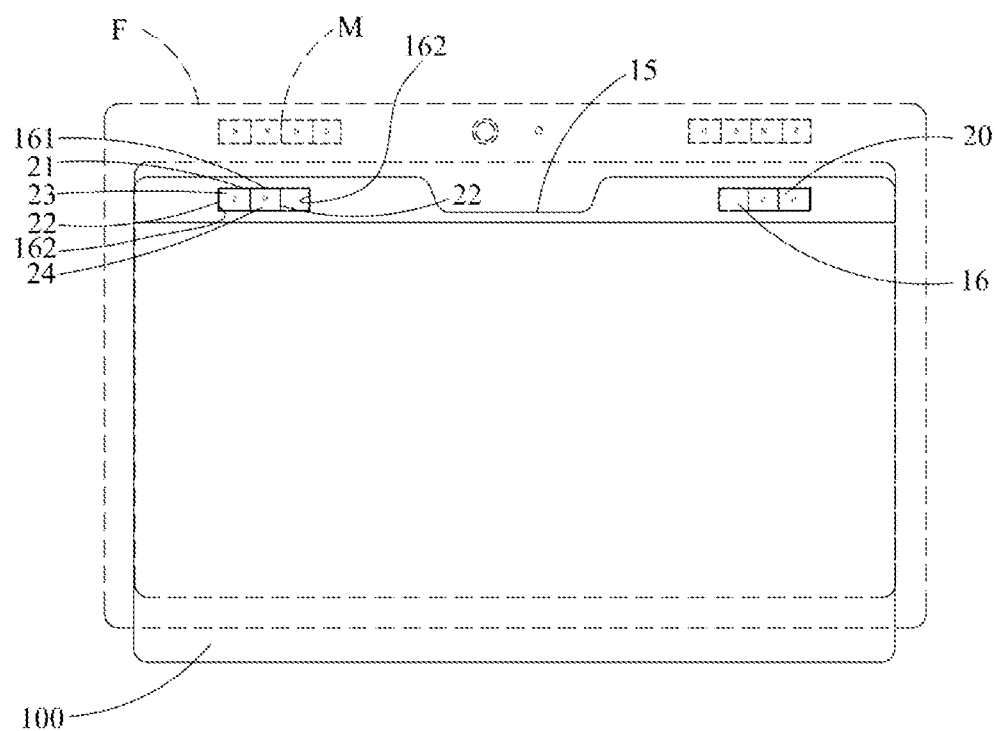
FIG. 7 and FIG. 8 are schematic diagrams of moving and adjusting an attachment member of the attachment position adjustable membrane in FIG. 1 according to magnetic pole positions of a magnet of an electronic device.
Figure 8:
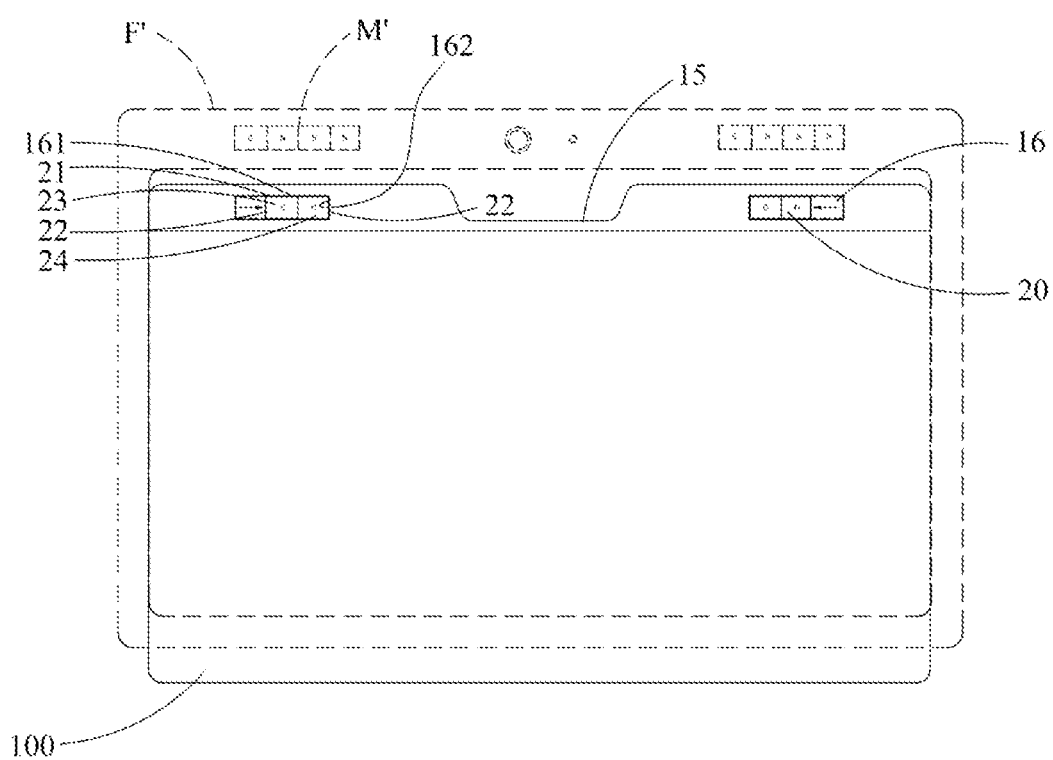

Referring to FIG. 7 and FIG. 8, FIG. 7 and FIG. 8 are schematic diagrams showing operations in the first embodiment of the attachment position adjustable membrane 100 according to the present invention. The attachment member 20 is movable between a first position and a second position in the accommodating and guiding portion 16. As show in FIG. 7, the at least one attachment member 20 moves to the first position, the second magnetic pole 24 is located at the center of the accommodating and guiding portion 16, and a short edge 22 of the attachment member 20 abuts against a short edge 162 of the accommodating and guiding portion 16. In this case, the first magnetic pole 23 abuts against the short edge 162 of the accommodating and guiding portion 16, and the second magnetic pole 24 is located at the center of the accommodating and guiding portion 16. As shown in FIG. 8, when the attachment member 20 moves to the second position, the other short edge 22 of the attachment member 20 abuts against the other short edge 162 of the accommodating and guiding portion 16. In this case, the second magnetic pole 24 abuts against the short edge 162 of an opposite side of the accommodating and guiding portion 16, and the first magnetic pole 23 is located at the center of the accommodating and guiding portion 16. Therefore, the position of the second magnetic pole 24 of the attachment member 20 at the first position corresponds to the position of the first magnetic pole 23 of the attachment member 20 at the second position. In addition, in this embodiment, the length of the long edge 161 of the accommodating and guiding portion 16 is 1.5 times longer than the length of long edge 21 of the attachment member 20. Although the attachment member 20 in this embodiment is illustrated by taking a pair of magnetic poles as an example, the present invention is not limited to this. The attachment member 20 may also have a plurality of pairs of magnetic poles. To provide a space for the attachment member 20 to move to correspond to different magnetic pole arrangements of electronic devices, the length of the long edge 161 of the accommodating and guiding portion 16 may be one magnetic pole longer than the long edge 21 of the attachment member 20. For example, if the length of the long edge 21 of the attachment member 20 is L, the total number of the magnetic poles is N, the length of each magnetic pole is L/N, the length of the long edge 161 of the accommodating and guiding portion 16 may be L/N longer than the long edge 21 of the attachment member 20. Considering the characteristic that the number of magnetic poles of the magnetic pole pairs is even, N is an even number.

Figure 11:
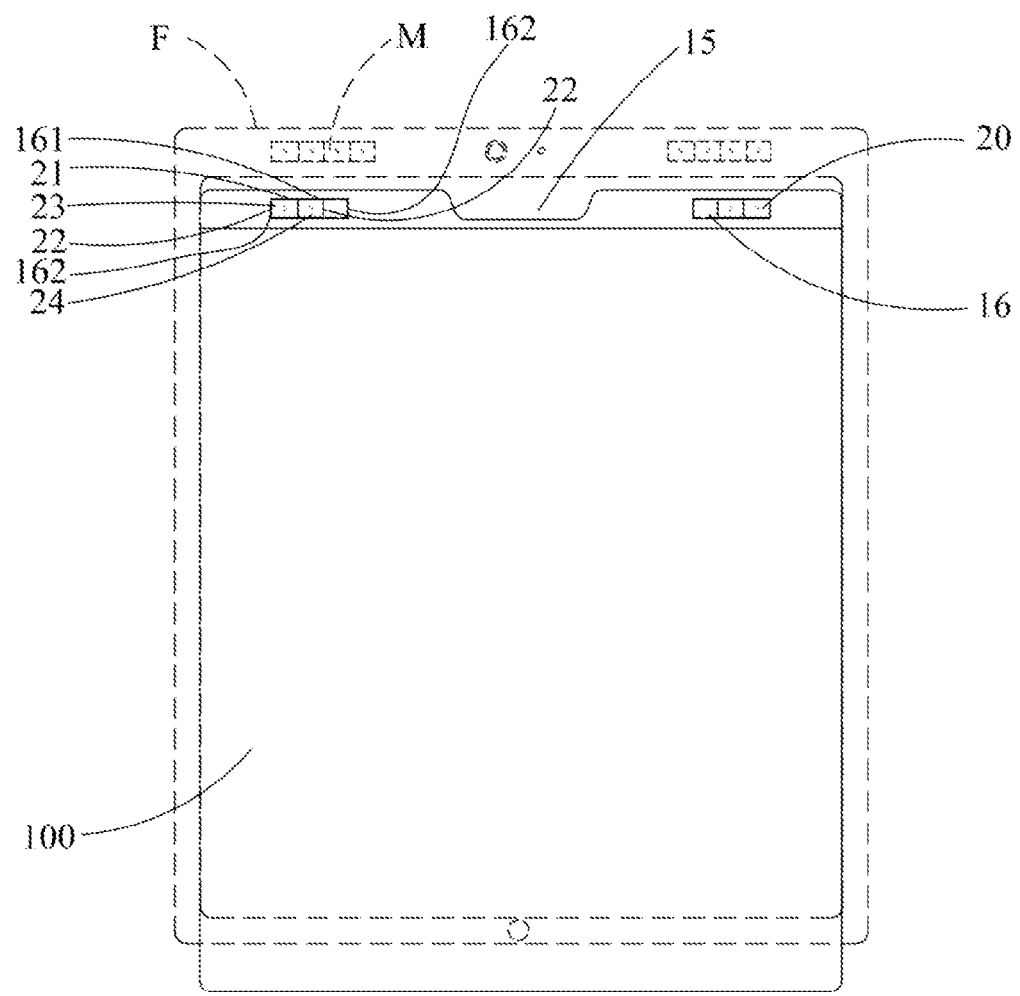
FIG. 11 is a schematic diagram of application of an attachment position adjustable membrane to a tablet computer according to the present invention.

As shown in FIG. 7, the magnetic poles of a magnet M on the left side of a screen frame F of an electronic device are a north pole, a south pole, a north pole, and a south pole arranged from left to right. Moreover, the first magnetic pole 23 of the attachment member 20 of the attachment position adjustable membrane 100 of the present invention is a south pole and the second magnetic pole 24 is a north pole. Therefore, when the attachment position adjustable membrane 100 of the present invention is placed in the screen frame F of the electronic device, the attachment member 20 moves to the first position in the accommodating and guiding portion 16, so that the magnetic poles of the attachment member 20 correspond to the magnetic poles with opposite polarities of the magnet M on the left side of the screen frame F to produce the effect of attraction. As shown in FIG. 8, the magnetic poles of a magnet M' on the left side of a screen frame F' of another electronic device are a south pole, a north pole, a south pole, and a north pole arranged from left to right. When the attachment position adjustable membrane 100 of the present invention is placed in the screen frame F' of the electronic device, the attachment member 20 moves rightward to the second position in the accommodating and guiding portion 16, so that the magnetic poles of the attachment member 20 correspond to the magnetic poles with opposite polarities of the magnet M' on the left side of the screen frame F' to produce the effect of attraction. In this way, the attachment position adjustable membrane 100 of the present invention may be applied to screen frames with different magnet polarity arrangement modes. FIG. 11 shows an embodiment of application of the attachment position adjustable membrane 100 to a tablet computer according to the present invention. The ratios of length to width of screens of a tablet computer and a notebook computer are different. Therefore, the size ratio of the attachment position adjustable membrane 100 in this embodiment is also set to correspond to that of the screen of the tablet computer. The arrangements of the remaining elements are the same as those in the embodiments of FIG. 7 and FIG. 8, and the same elements are represented by the same symbols and descriptions thereof are omitted. In addition, the arrangement of the accommodating and guiding portion 16 and the attachment member 20 is not limited to the first edge. In another embodiment, the accommodating and guiding portion and the attachment member may also be arranged on the second edge opposite to the first edge. In another embodiment, accommodating and guiding portions and attachment members may also be arranged on all four edges of the attachment position adjustable membrane 100.

Please return to FIG. 1 and FIG. 2, the attachment position adjustable membrane 100 of the present invention further includes a shielding member 30. As shown in FIG. 1, the attachment position adjustable membrane 100 includes two shielding members 30 that are respectively disposed on two opposite surfaces of the membrane body 10 and cover openings of the accommodating and guiding portion 16 on the two surfaces of the membrane body 10. The shielding member 30 is structurally capable of reliably maintaining the attachment member 20 in the accommodating and guiding portion 16 to prevent the attachment member 20 from fall-off. The shielding member 30 can achieve the function of making the surface of the membrane body 10 smooth and beautiful in appearance.

Figure 4:
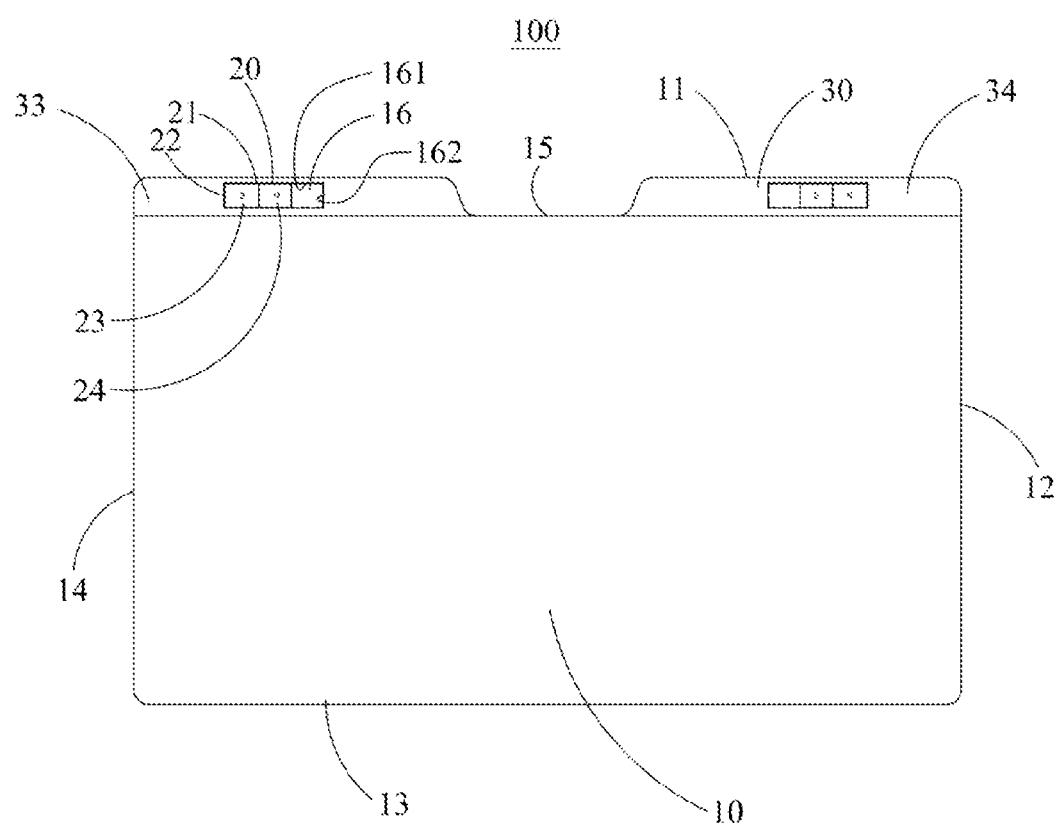
FIG. 4 is a front view of a third embodiment of an attachment position adjustable membrane according to the present invention.

As shown in FIG. 1, the shielding member 30 may be long strip-shaped and the length thereof is equal to that of the first edge 11 of the membrane body 10. Moreover, the shielding member 30 is also provided with a relief groove 31 at a position corresponding to the relief groove 15 of the membrane body 10, so as not to shield the transceiver port of an optical or audio module of the electronic device. The edge of the shielding member 30 is flush with the first edge 11. In this embodiment, the shielding member 30 includes a first shielding portion 33 and a second shielding portion 34. The first shielding portion 33 and the second shielding portion 34 are respectively disposed on two sides of the relief groove 15 and respectively cover the accommodating and guiding portion 16. Edges of the first shielding portion 33 and the second shielding portion 34 are respectively flush with the first edge 11 and the edge of the relief groove 15. As shown in FIG. 1, the shielding member 30 includes a connecting portion 35, the connecting portion 35 connects the first shielding portion 33 and the second shielding portion 34, and the connecting portion 35 is adjacent to the edge of the relief groove 15. As shown in FIG. 3, the shielding member 30 may also be long strip-shaped, but is also provided with a through hole 31' at a position corresponding to the through hole 15' of the membrane body 10, so as not to shield the transceiver port of the optical or audio module of the electronic device. As shown in FIG. 4, FIG. 4 shows a third embodiment of the attachment position adjustable membrane 100 according to the present invention. Each shielding member 30 includes two long strip-shaped members with shorter lengths, which are respectively disposed on two sides of the relief groove 15. Edges of the two long strip-shaped members are flush with the first edge 11. In addition to respectively shielding the openings of the accommodating and guiding portion 16, the two long strip-shaped members may also keep clear of the relief groove 15. The shielding member 30 in this embodiment includes a first shielding portion 33 and a second shielding portion 34. However, the first shielding portion 33 and the second shielding portion 34 in this embodiment are arranged separately, and there is no the connecting portion 35 as shown in FIG. 1.

Figure 5:
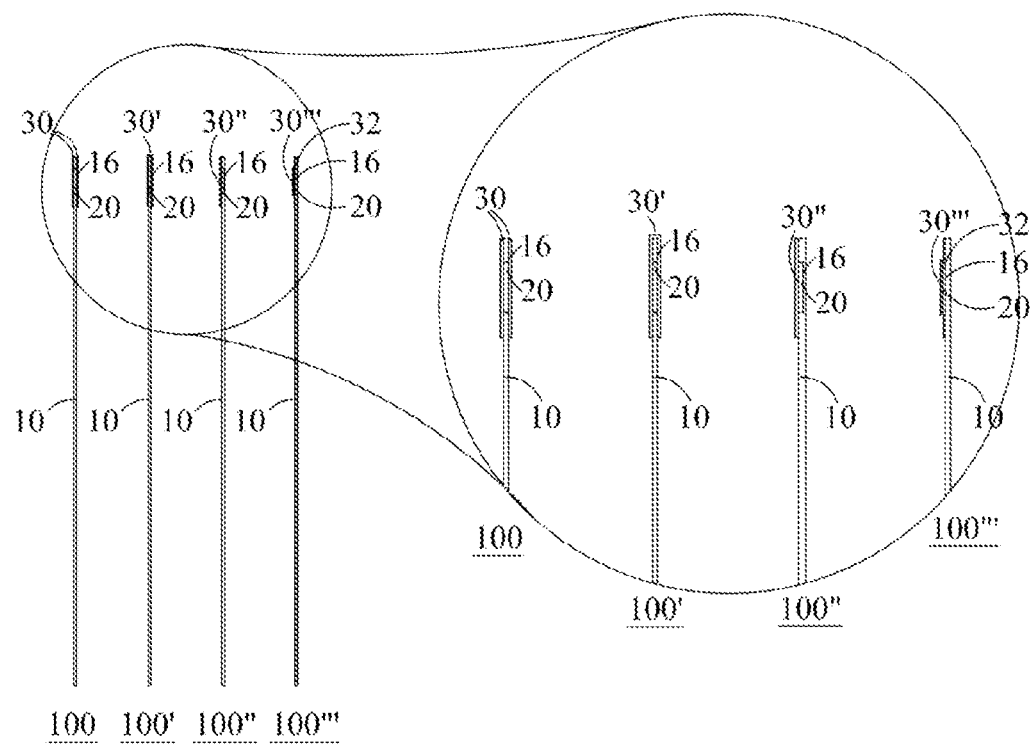
FIG. 5 is a cross-sectional view of first and fourth to sixth embodiments of an attachment position adjustable membrane according to the present invention.

FIG. 5 is a cross-sectional view of the first embodiment, a fourth embodiment, a fifth embodiment and a sixth embodiment of the attachment position adjustable membrane 100 according to the present invention. As shown in FIG. 5, the attachment position adjustable membrane 100 is a cross-sectional view of the first embodiment. Two shielding members 30 are respectively provided on two surfaces of the membrane body 10, and cover openings of the accommodating and guiding portion 16 on the two surfaces of the membrane body 10. An attachment position adjustable membrane 100' is a cross-sectional view of the fourth embodiment. A shielding member 30' is U-shaped and spans the first edge 11 of the membrane body 10. Two sides of the shielding member 30' respectively cover the openings of the accommodating and guiding portion 16 on the two surfaces of the membrane body 10. An attachment position adjustable membrane 100" is a cross-sectional view of the fifth embodiment. The thickness of the membrane body 10 is increased by 10%-15% than the first embodiment. Moreover, the accommodating and guiding portion 16 is a blind slot. That is, the accommodating and guiding portion 16 is only open at one surface of the membrane body 10. Therefore, the attachment position adjustable membrane 100" is provided with only one shielding member 30'". An attachment position adjustable membrane 100''' is a cross-sectional view of the sixth embodiment. The membrane body 10 in this embodiment is not provided with a slot, but a recessed portion 32 is formed on one surface of a shielding member 30'''. The attachment member 20 is placed in the recessed portion 32. When the shielding member 30''' is fixed to the surface of the membrane body 10, the recessed portion 32 and the surface of the membrane body 10 form a member having the same function as the accommodating and guiding portion 16. The other surface of the shielding member 30''' may be in the shape of a step or a flat plane as shown in FIG. 5, and no limitation is made.

Figure 6:
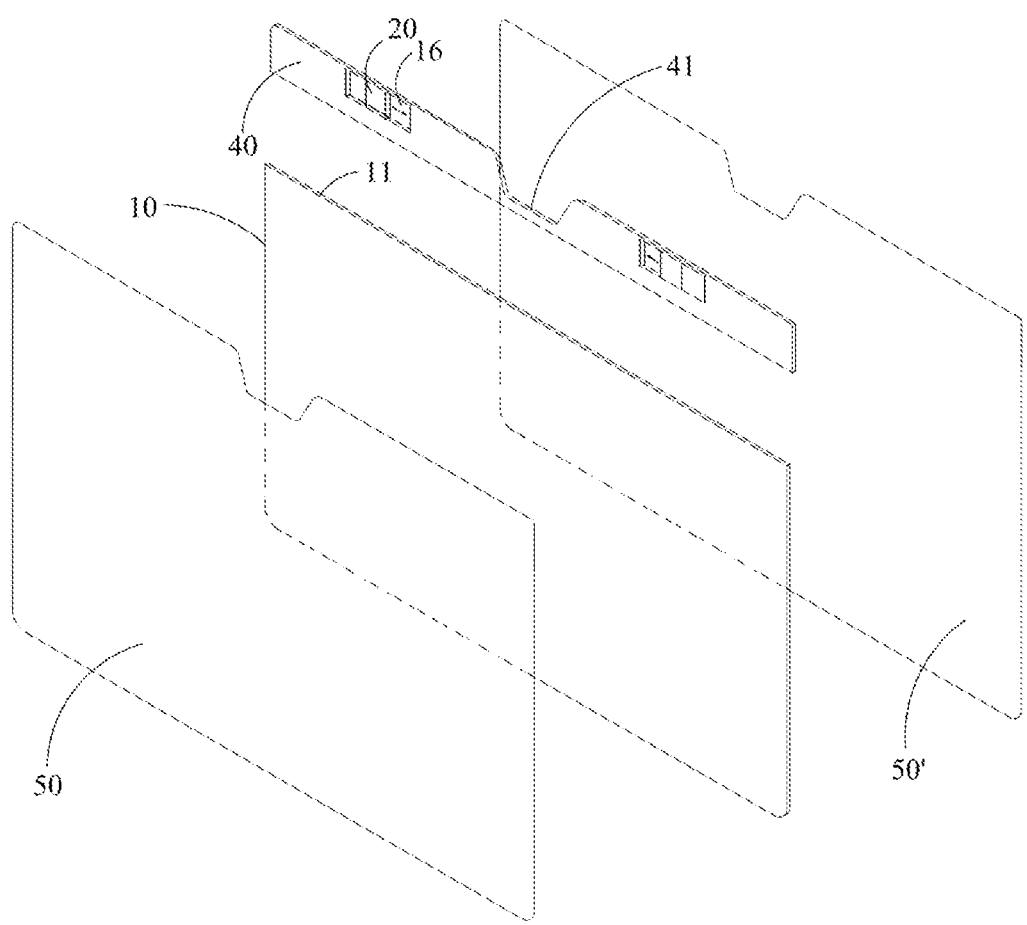
FIG. 6 is an exploded perspective view of a seventh embodiment of an attachment position adjustable membrane according to the present invention.

FIG. 6 shows a seventh embodiment of the attachment position adjustable membrane 100 according to the present invention. The membrane body 10 in this embodiment may be completely the same as the screen in size. The first edge 11 of the membrane body 10 is provided with an accommodating member 40. The edge of the accommodating member 40 and the first edge 11 of the membrane body 10 are fixed edge to edge. The position of the accommodating member 40 corresponds to that of a screen frame of an electronic device. Two opposite surfaces of the membrane body 10 are respectively provided with positioning membranes 50 and 50'. The size of the positioning membranes 50 and 50' is the sum of the sizes of the membrane body 10 and the accommodating member 40. The membrane 50 covers a joint between the accommodating member 40 and the membrane body 10. Thus, the accommodating member 40 is more reliably fixed to the first edge 11 of the membrane body 10. The accommodating and guiding portion 16 is disposed in the accommodating member 40, and the attachment member 20 is movably disposed in the accommodating and guiding portion 16. The accommodating member 40 is provided with a relief groove 41 configured to avoid shielding the transceiver port of the optical and audio module of the electronic device. For the structure of the accommodating and guiding portion 16, in addition to the slot in the first embodiment, the structures of the accommodating and guiding portion 16 in the fifth embodiment and the sixth embodiment of FIG. 5 may also be applied to this embodiment. That is, the blind slot in the fifth embodiment is formed on the accommodating member 40 or the recessed portion in the sixth embodiment is formed on the membrane 50.

Figure 9:
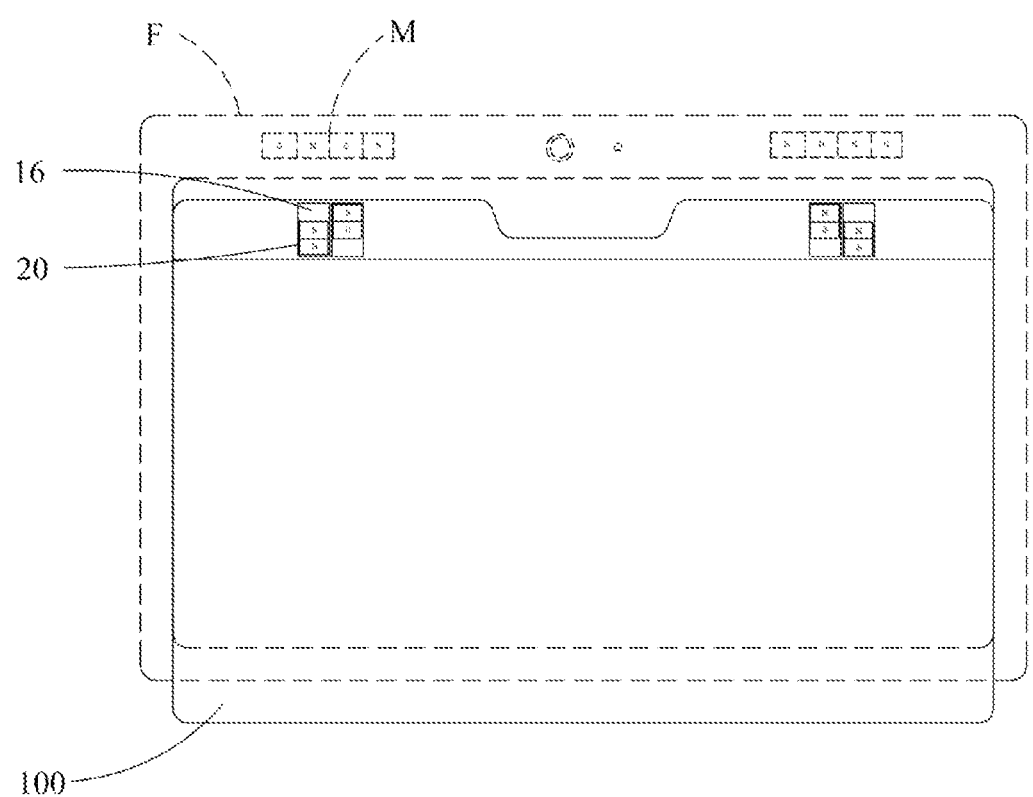
FIG. 9 shows an attachment position adjustable membrane of an eight embodiment of an attachment position adjustable membrane according to the present invention.
Figure 10:
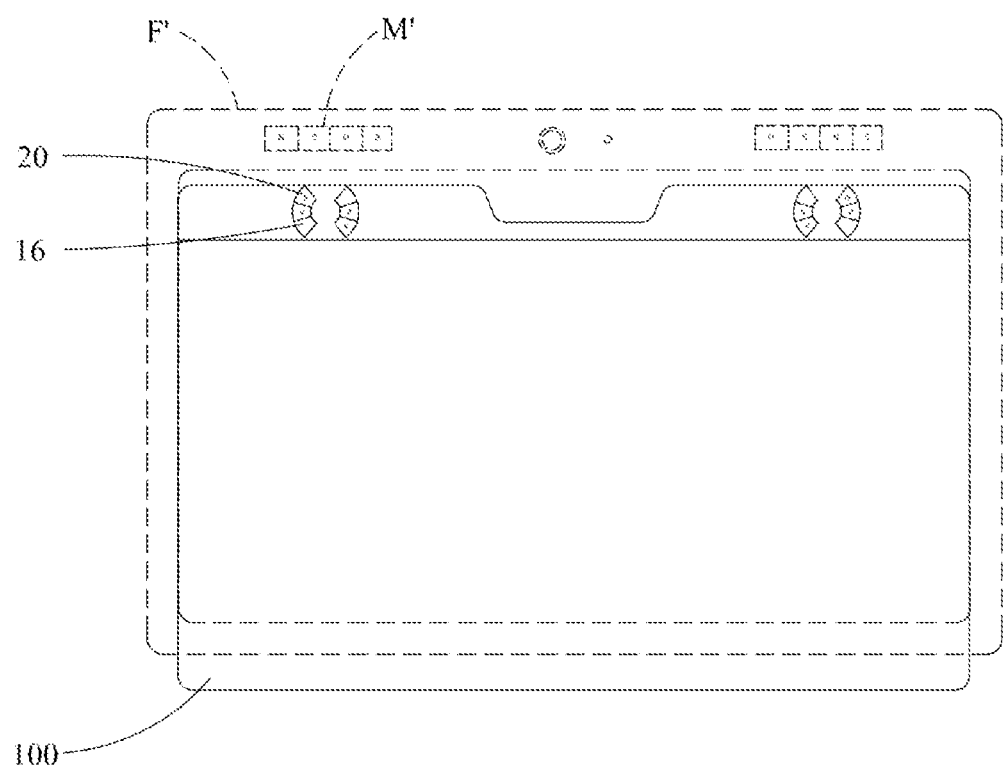
FIG. 10 shows an attachment position adjustable membrane of a ninth embodiment of an attachment position adjustable membrane according to the present invention.

FIG. 9 and FIG. 10 respectively show an eighth embodiment and a ninth embodiment of the attachment position adjustable membrane 100 according to the present invention. As shown in FIG. 9, the long edge 161 of the accommodating and guiding portion 16 in this embodiment is disposed perpendicular to the first edge 11 of the membrane body 10. The attachment member 20 moves up and down in the accommodating and guiding portion 16 along the long edge 161. Each accommodating and guiding portion 16 corresponds to a position of a magnetic pole of the screen frame F. Four accommodating and guiding portions 16 are provided in FIG. 9. The attachment member 20 in each accommodating and guiding portion 16 individually moves corresponding to a magnetic pole of the magnet of the screen frame F, so as to be attracted to the screen frame F. The attachment member 20 in this embodiment moves perpendicular to the first edge 11, and is thus suitable for an electronic device of which the screen frame F has a larger width. The embodiment of FIG. 10 has a similar accommodating and guiding portion 16 to the embodiment of FIG. 9. The accommodating and guiding portion 16 in FIG. 10 is a fan-shaped slot, and the attachment member 20 is a fan-shaped sheet member. The attachment member 20 may move around the center of a circle of the fan shape in the accommodating guiding portion 16, and is correspondingly attracted to the magnet of the screen frame F.

According to the attachment position adjustable membrane of the present invention, by providing the accommodating and guiding portion having a greater length than the attachment member on the membrane body, the attachment member may be moved by the guide of the accommodating and guiding portion. Moreover, the accommodating and guiding portion also provides a space for the attachment member to move, so that the attachment member may move according to magnetic pole positions of the magnet provided in the screen frame of the electronic device. Thus, the magnetic poles with different magnetic properties are arranged correspondingly, so that the attachment member is attracted to the screen frame of the electronic device, thereby achieving the effect of positioning the membrane on the screen frame of the electronic device. The attachment position adjustable membrane of the present invention may be used as a protective sheet for a screen, a privacy filter for protecting privacy of a user, a light filter for filtering light, or the like, or is used as a protective membrane for a keyboard of a notebook computer. The attachment position adjustable membrane of the present invention can be attracted using a magnet provided on a main unit housing, and is applicable to any electronic device provided with a magnet.

However, the above are merely preferred embodiments of the present invention, and the scope of implementations of the present invention cannot be limited by this. That is, any simple equivalent changes and modifications made in accordance with the claims and the description of the present invention still all fall within the scope of the patent of the present invention.

DESCRIPTION OF REFERENCE NUMERALS

10: Membrane body
11: First edge
12: Second edge
13: Third edge
14: Fourth edge
15: Relief groove
15': Through hole
16: Accommodating and guiding portion
20: Attachment member
21: Long edge
22: Short edge
23: First magnetic pole
24: Second magnetic pole
30, 30', 30'', 30''': Shielding member
31: Relief groove
31': Through hole
32: Recessed portion
33: First shielding portion
34: Second shielding portion
35: Connecting portion
40: Accommodating member
41: Relief groove
50: Positioning membrane
100, 100', 100'', 100''': Attachment position adjustable membrane
161: Long edge
162: Short edge
F, F': Screen frame
M, M': Magnet

What is claimed is:

1. An attachment position adjustable membrane, comprising:
a membrane body that allows light to pass through and is provided with at least one accommodating and guiding portion; and
at least one attachment member movably disposed in the at least one accommodating and guiding portion;
wherein the at least one attachment member is movable between a first position and a second position in the accommodating and guiding portion;
the at least one attachment member has a first magnetic pole and a second magnetic pole with different polarities, and the first magnetic pole is disposed adjacent to the second magnetic pole.

2. The attachment position adjustable membrane according to claim 1, wherein after the light passes through the membrane body, an irradiation range of emergent light thereof is limited to a given angle range, or component light of at least one wavelength of the light is absorbed or reflected by the membrane body.

3. The attachment position adjustable membrane according to claim 1, wherein when the at least one attachment member is located at the first position, the second magnetic pole is located at the center of the accommodating and guiding portion, and when the at least one attachment member is located at the second position, the first magnetic pole is located at the center of the accommodating and guiding portion.

4. The attachment position adjustable membrane according to claim 1, wherein the accommodating and guiding portion is a slot; the slot has a long edge and a short edge, and the at least one attachment member is disposed in the slot and moves between the first position and the second position along the long edge.

5. The attachment position adjustable membrane according to claim 4, wherein the membrane body has a first edge; the slot is disposed close to the first edge, and the long edge of the slot is parallel to the first edge or an extension line of the long edge intersects the first edge.

6. The attachment position adjustable membrane according to claim 5, further comprising at least one shielding member that is disposed on the membrane body and covers the slot.

7. The attachment position adjustable membrane according to claim 6, wherein the at least one shielding member spans both sides of the first edge and covers openings of the slot located on two sides of the membrane body.

8. The attachment position adjustable membrane according to claim 5, comprising two shielding members, wherein the shielding members are respectively disposed on two sides of the membrane body and respectively cover openings of the slots located on the two sides of the membrane body.

9. The attachment position adjustable membrane according to claim 5, wherein the membrane body is provided with a relief groove; the relief groove is located on the first edge, and the relief groove corresponds to an optical lens of an electronic device.

10. The attachment position adjustable membrane according to claim 9, comprising at least two slots, wherein the slots are respectively disposed on two sides of the relief groove.

11. The attachment position adjustable membrane according to claim 10, wherein the shielding member comprises a first shielding portion and a second shielding portion, and the first shielding portion and the second shielding portion are respectively disposed on the two sides of the relief groove and respectively cover the slots.

12. The attachment position adjustable membrane according to claim 11, wherein the shielding member further comprises a connecting portion, the connecting portion connects the first shielding portion and the second shielding portion, and the connecting portion is adjacent to the relief groove.

13. The attachment position adjustable membrane according to claim 3, wherein the position of the second magnetic pole of the attachment member at the first position corresponds to the position of the first magnetic pole of the attachment member at the second position.

14. The attachment position adjustable membrane according to claim 13, wherein a difference between the length of the long edge of the accommodating and guiding portion and the length of a long edge of the attachment member is equal to the length of the first magnetic pole or the second magnetic pole.

15. The attachment position adjustable membrane according to claim 14, wherein the length of the long edge of the slot is 1.5 times longer than the length of the attachment member, and the length of the first magnetic pole and the length of the second magnetic pole are each half of the length of the attachment member.

16. The attachment position adjustable membrane according to claim 1, wherein the accommodating and guiding portion is a recessed portion disposed on a plane of the membrane body, and the attachment member is movably disposed in the recessed portion.

17. The attachment position adjustable membrane according to claim 16, wherein the recessed portion has a long edge, and the attachment member moves between the first position and the second position along the long edge.

18. The attachment position adjustable membrane according to claim 17, further comprising at least one shielding member that is disposed on the membrane body and covers the recessed portion.

19. An attachment position adjustable membrane, comprising:
a membrane body that allows light to pass through;
at least one shielding member that is disposed on the membrane body and has at least one accommodating and guiding portion; and
at least one attachment member movably disposed in the at least one accommodating and guiding portion;
wherein the at least one attachment member is movable between a first position and a second position in the accommodating and guiding portion;
the at least one attachment member has a first magnetic pole and a second magnetic pole with different polarities, and the first magnetic pole is disposed adjacent to the second magnetic pole.

20. The attachment position adjustable membrane according to claim 19, wherein the at least one accommodating and guiding portion is a recessed portion, and the membrane body covers an opening of the recessed portion.

21. An attachment position adjustable membrane, comprising:
a membrane body that allows light to pass through;
an accommodating member having at least one accommodating and guiding portion,
wherein edges of the accommodating member are fixed to edges of the membrane body;
at least one positioning membrane that is disposed on the membrane body and the accommodating member and covers a joint between the membrane body and the accommodating member; and at least one attachment member movably disposed in the at least one accommodating and guiding portion;

wherein the at least one attachment member is movable between a first position and a second position in the accommodating and guiding portion;

the at least one attachment member has a first magnetic pole and a second magnetic pole with different polarities, and the first magnetic pole is disposed adjacent to the second magnetic pole.

22. The attachment position adjustable membrane according to claim 21, wherein the accommodating and guiding portion is a slot, the slot has a long edge and a short edge, the at least one attachment member is disposed in the slot and moves between the first position and the second position along the long edge, and the at least one positioning membrane covers the slot.

\* \* \* \* \*